United States Patent [19]

Scheier

[11] Patent Number: 4,669,148
[45] Date of Patent: Jun. 2, 1987

[54] MACHINE FOR CUTTING UP POULTRY INTO A NUMBER OF PIECES

[75] Inventor: Donald J. Scheier, Kansas City, Mo.
[73] Assignee: Simon-Johnson, Inc., Kansas City, Kans.
[21] Appl. No.: 694,010
[22] Filed: Jan. 23, 1985
[51] Int. Cl.$^4$ .............................................. A22C 21/00
[52] U.S. Cl. ....................................................... 17/11
[58] Field of Search ...................................... 17/11, 52
[56] References Cited

U.S. PATENT DOCUMENTS 4,406,037  9/1983  Hazenbroek ............................. 17/11
4,505,002  3/1985  Tieleman ................................. 17/11

Primary Examiner—Willie G. Abercrombie
Attorney, Agent, or Firm—Schmidt, Johnson, Hovey & Williams

[57] ABSTRACT

With manual labor reduced to but two loaders for a high output, cut-up machine for lowering labor costs in poultry processing plants, a series of equally spaced, bird-receiving, block-like heads, swingable on elongated, upright carriers, and advanced continuously along an elliptical path by a conveyor past seven, spaced-apart, constantly rotating blades to automatically and consistently provide successive, precision severances of the keel, the wings and the legs, as well as split and quarter the broilers into at least nine high quality pieces ready for packaging of the fast food product into one or more chickens per bag. The carriers span the distance between the arc connected to upper and lower, power driven conveyor chains. Swinging of the roller-equipped heads and actuation of components on the heads for supporting and stretching the birds thereon are effected solely, and throughout each cycle of advancement, by a number of elongated, stationary, roller-engaging, rod-like controllers.

21 Claims, 30 Drawing Figures

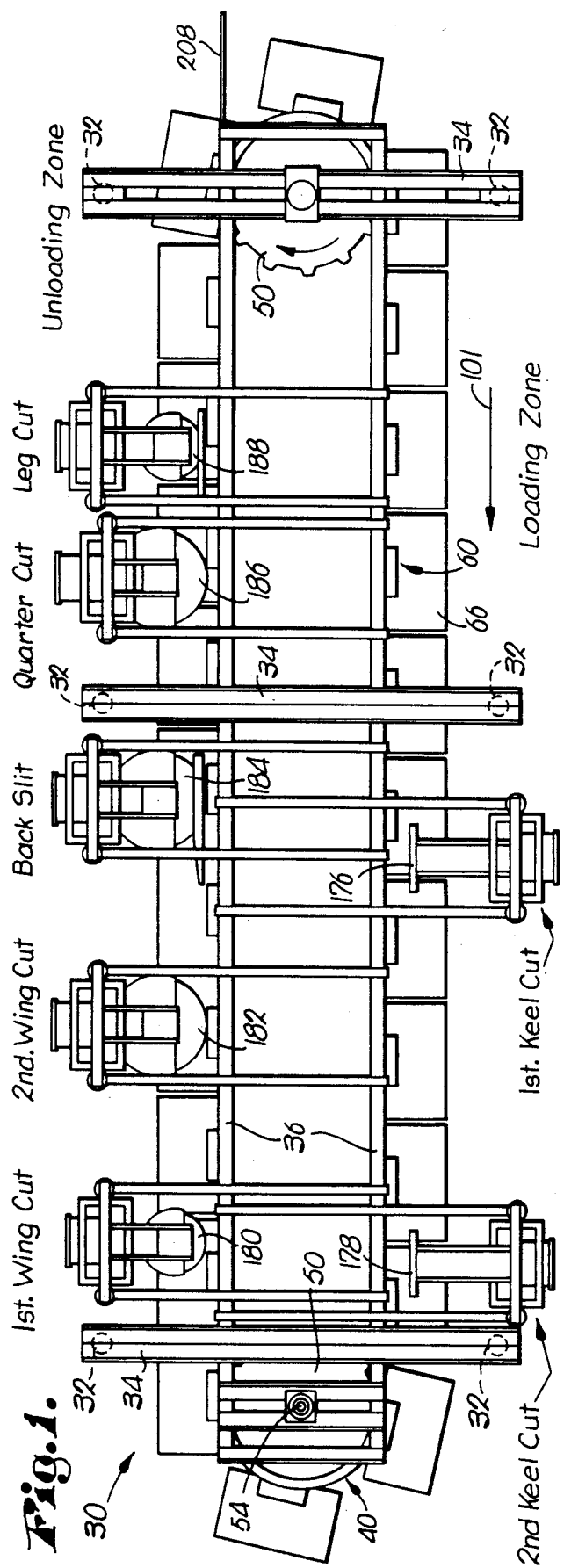
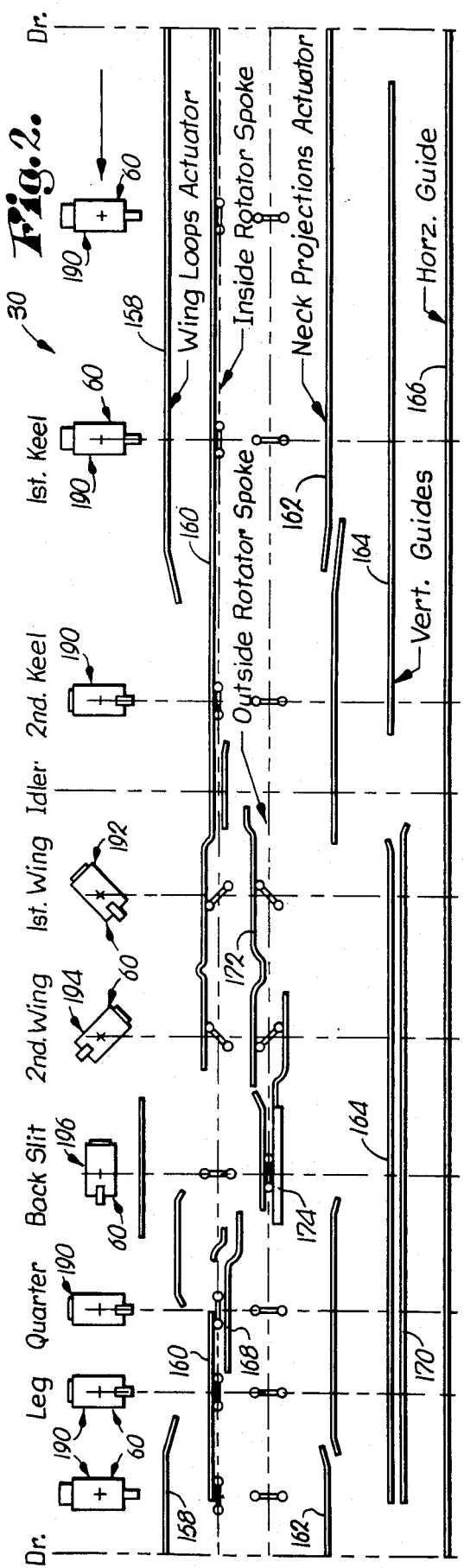

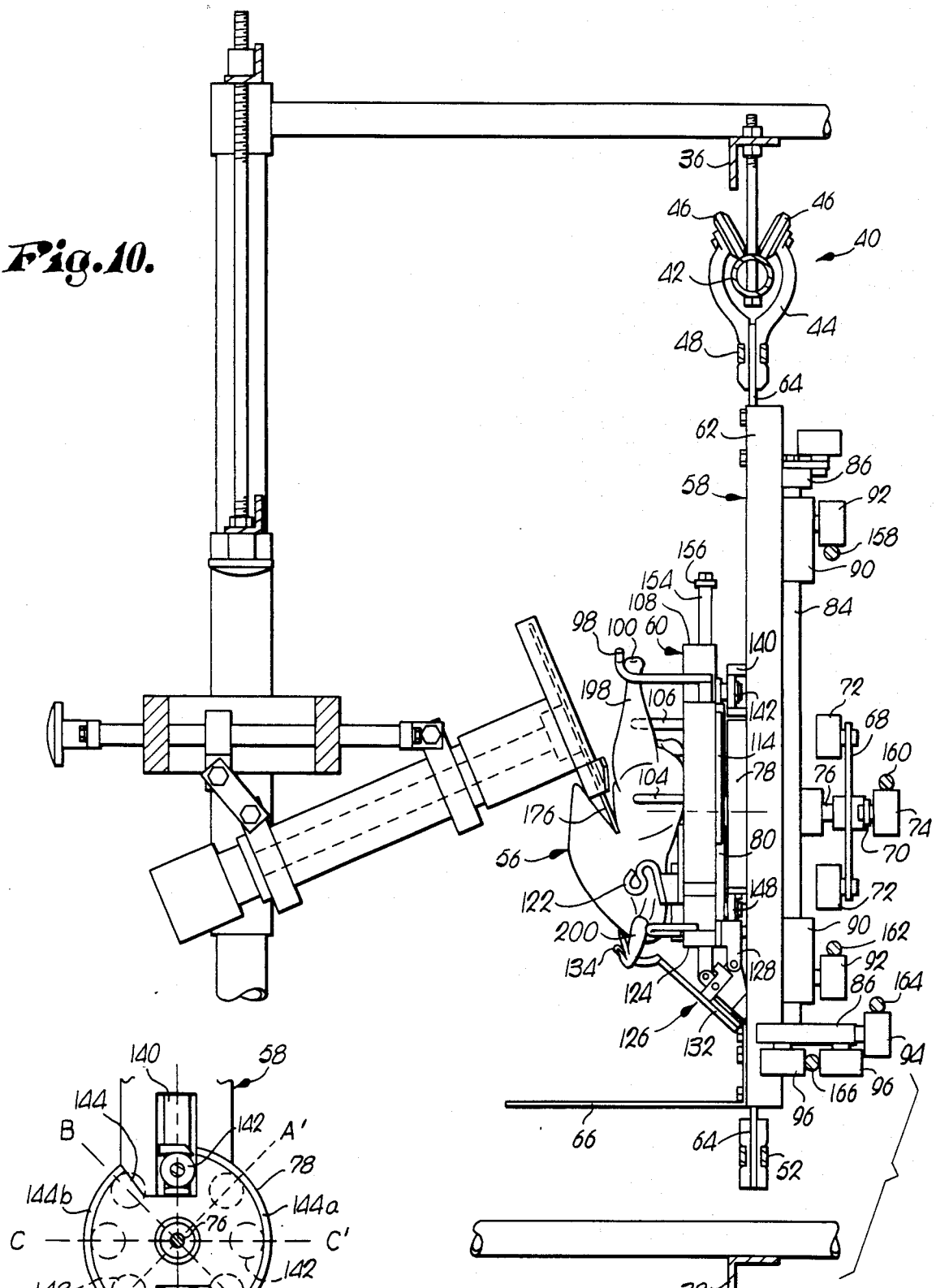

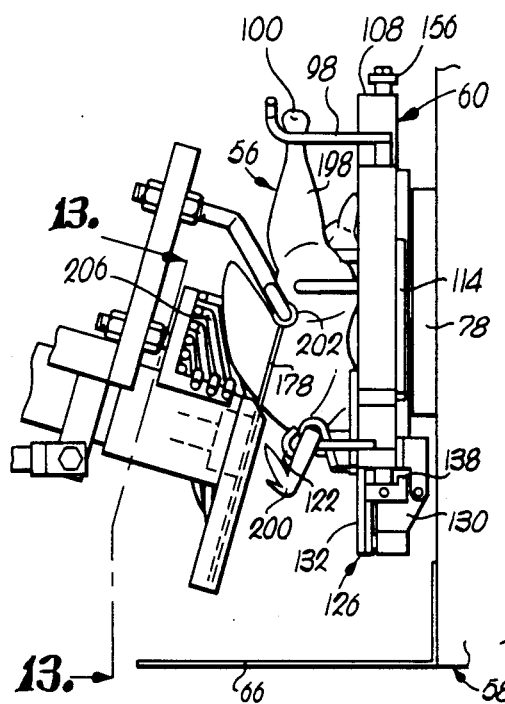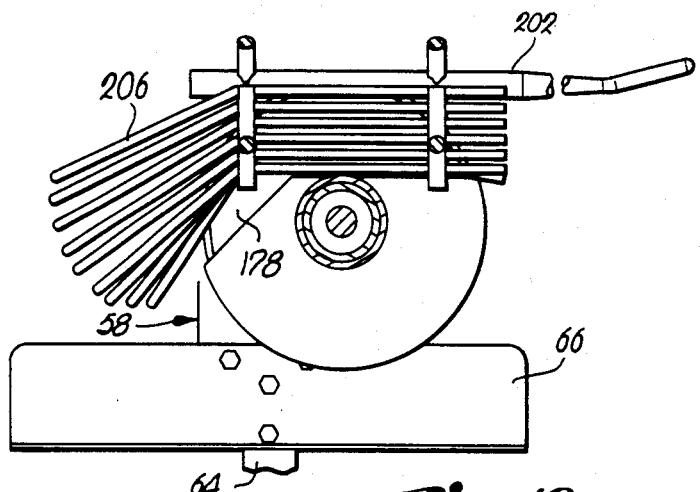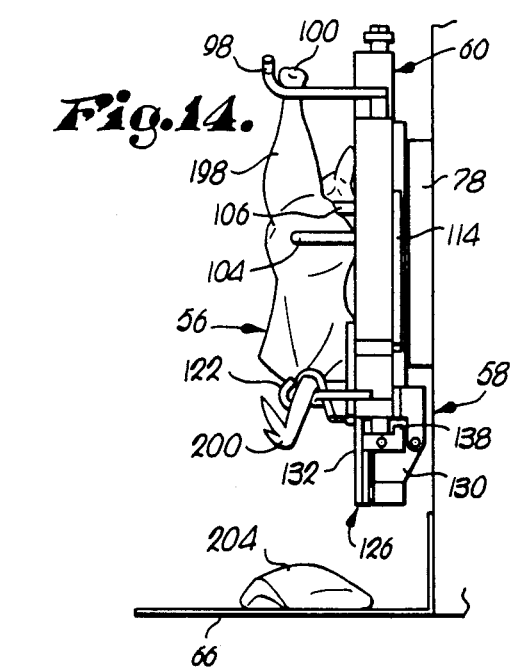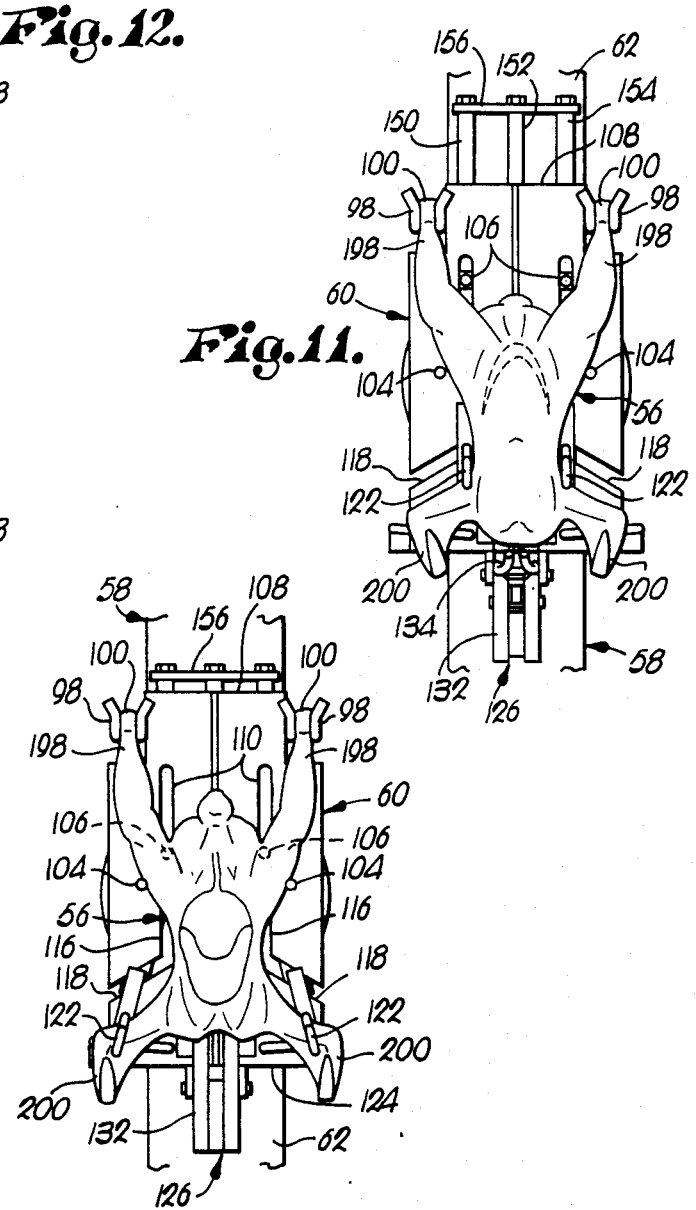
Fig. 12.
Fig. 13.
Fig. 14.
Fig. 11.
Fig. 15.

4,669,148

MACHINE FOR CUTTING UP POULTRY INTO A NUMBER OF PIECES

BACKGROUND OF THE INVENTION

To meet the need for each packaged chicken to be precisely pre-cut into separate pieces of the sizes and shapes demanded by the fast food industry, and at the same time, reduce production costs, poultry processing plants require a trouble-free, labor-saving machine which is fully automatic throughout all the cutting steps until the several parts of each bird are discharged to a bagger. While the killing, dressing, evisceration, chilling and other handling of commercialized poultry has become quite fully and successfully developed, the transgression from primary marketing of whole birds to public and business desire for packages of pre-cut pieces has left the cut-up operations somewhat deficient in the substantial elimination of numerous, inprecise, knife-wielding operators. The long-felt need is met by the instant invention relating to a cut-up method and machine which provides the solution to the many problems not heretofore solved by many unsuccessful efforts over a relatively long period of time.

SUMMARY OF THE PRESENT INVENTION

Previously dressed and eviscerated birds, with their feet, heads and necks removed, are continuously advanced at a preselected, steady speed along a predetermined path of travel, while hanging from their hocks, through several cutting zones for automatically severing from each of the carcasses a plurality of individual pieces to be grouped into packages before marketing.

Through use of an overhead conveyor provided, for example, with twenty-four, horizontally spaced yokes, each having a pair of wheels which roll along a horizontal tube track, together with an upper chain and sprocket wheel drive assembly for the yokes, a bird is suspended from each yoke through use of a head which is, in turn, supported by an elongated channel-type carrier. The upright carries connect with the upper chain and with the chain of a lower chain and sprocket wheel assembly. One sprocket wheel of each assembly at one end of the machine is driven through a common vertical shaft by an overhead hydraulic motor.

Each rectangular, block-like head, disposed at the front of its corresponding carrier, is swingable about a horizontal axis which traverses the horizontal path of travel of the carriers and their heads. During each complete cycle of each carrier its head turns from a first starting position with its longitudinal axis vertical to a second position rotated about 45° clockwise, then to a third position rotated about another 90° clockwise, thereupon to a fourth position rotated about 45° counterclockwise, such that its longitudinal axis is disposed horizontally, and finally, rotated about another 90° counterclockwise back to the first position such that its longitudinal axis is once again vertical before the cycle is completed and the next succeeding cycle is commenced without interruption.

The rotation of the heads places the birds in four strategic positions such that the parts can be properly cut by use of, for example, seven stationary cutting units each provided with a constantly rotating, circular cutting blade or disc and a drive motor. As a result there is provided, in the following succession, (1) a downward flank cut, (2) an upward keel cut-off, (3) a first wing cut, (4) a cut for the other wing, (5) slitting of the bird into halves, (6) a quarter cut and, lastly (7) a cut-off of the two legs, resulting in nine pieces.

Provision is made for rod-like controllers or actuators which serve as guides but, much more importantly, the use of a number of similar, elongated controllers or actuators, operating in conjunction with rollers, for not only serving as the sole means for swinging the heads but as the sole means for actuating the various components on the head which stabilize the birds on the heads during most of the severing steps. Eliminated, therefore, are such miscellaneous devices as locks and delocks, block and deblocks, processing arms, adjusting mechanisms, discs, cams, levers, followers and the like which abundantly adorn prior, experimental machines.

DETAILED DESCRIPTION OF THE DRAWINGS

FIG. 1 is a schematic, top plan view of a poultry cut-up machine made pursuant to my present invention;

FIG. 2 is a diagrammatical, elevational view showing essentially the location of the various means for rotating the heads, and operating other components of the machine;

FIG. 10 is a vertical, cross-sectional view on the scale of FIG. 3 showing a bird manually hung by its hocks from prongs on the head while in a vertical position, with the breast facing outwardly, and showing the downward flank cut between the breast bone and the thigh;

FIG. 11 is an elevational view showing a bird on a head as initially placed thereon manually and illustrating by dotted lines the downward flank cut;

FIG. 12 is a fragmentary, side elevational view showing a bird on a head, in turn supported by a carrier and illustrating the upward cut through the breast, severing the keel from the breast;

FIG. 13 is a cross-sectional view taken on line 13—13 of FIG. 12;

FIG. 14 is a view similar to FIG. 12 showing the severed keel deposited on an underlying tray;

FIG. 15 is a fragmentary, elevational view showing a bird on a head after dropping of the keel therefrom;

FIG. 30 is a diagrammatical, elevational view of the dished retainer together with rollers associated therewith.

DESCRIPTION OF THE PREFERRED EMBODIMENT

Figure 3:
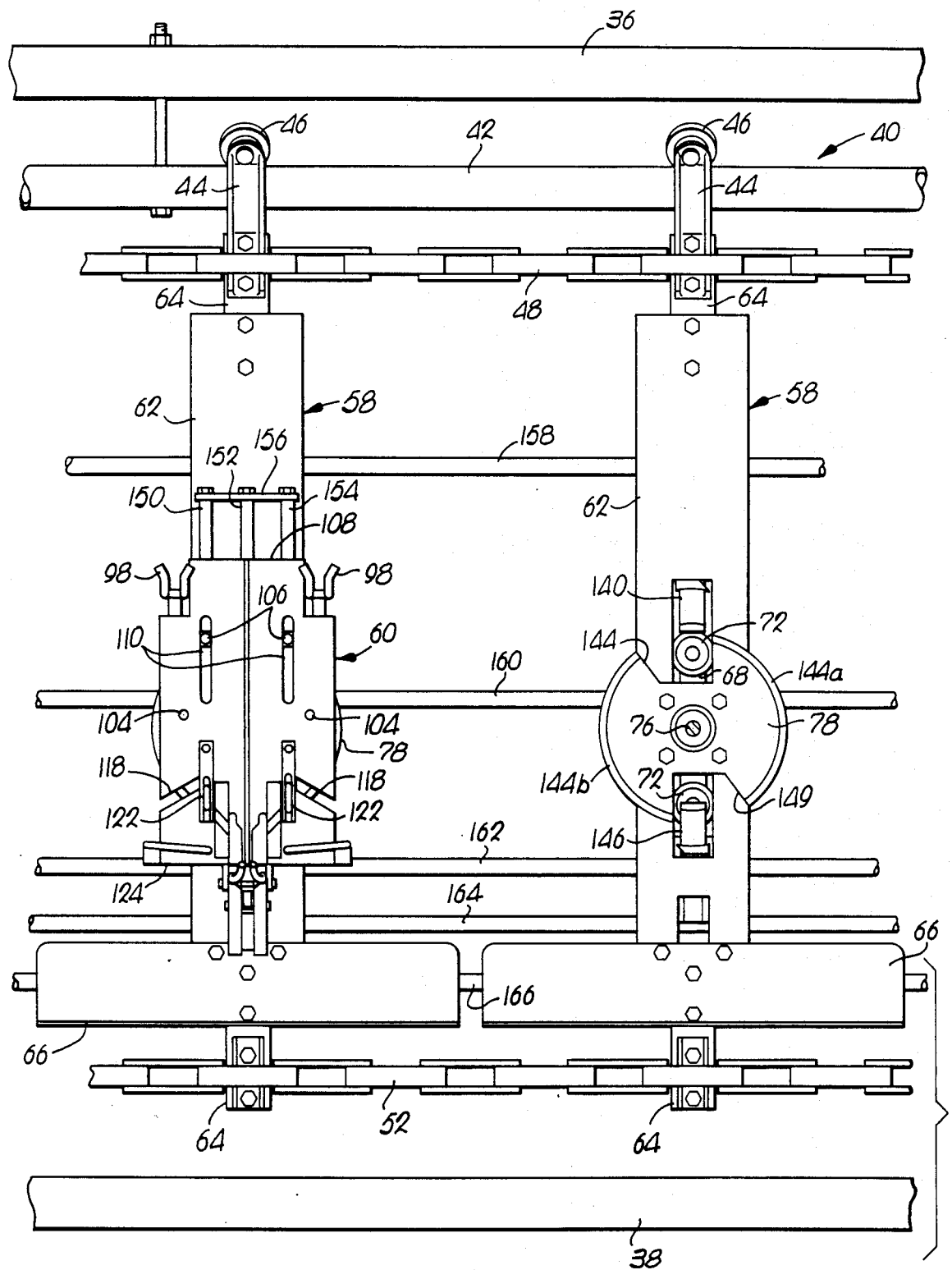
FIG. 3 is an enlarged, fragmentary, side elevational view showing one complete head and its carrier together with a second carrier, but with its head removed.

Referring to FIGS. 1 and 2 of the drawings throughout hereinafter and, from time to time, to FIGS. 3-30, an elongated, self-standing poultry cut-up machine 30, made according to my present invention is contemplated, for example, to be at least twenty-two feet long, about five and one-half feet wide and approximately seven and one-half feet high. Supporting framework includes three pairs of spaced, upright posts 32, each pair being joined by upper and lower crossbars 34. The upper bars 34 carry a pair of upper, horizontally spaced, longitudinal rails 36 and the lower bars 34 support a pair of lower, horizontally spaced, longitudinal rails 38.

An overhead conveyor 40 has a continuous, horizontal, elliptical, tube track 42 suspended from the upper bars 34 and a plurality, for example, of twenty-four, horizontally spaced yokes 44. Each yoke 44 has a pair of wheels 46 which roll along the track 42, the yokes 44 being connected below the track 42 to an upper, continuous, horizontal, elliptical drive chain 48 trained around upper, horizontal sprocket wheel 50 at the ends of the machine 30.

A lower, continuous, horizontal, elliptical chain 52, disposed just above the rails 38, is also trained around a pair of horizontal, end sprocket wheels. Each wheel 50 and its corresponding lower wheel is rigidly connected to a vertical shaft 54, one of such end shafts being driven, as by an overhead, variable speed hydraulic motor, such that, at a preselected shaft speed, the yokes 44 will travel a number of feet per minute, clockwise viewing FIG. 1, cutting a plurality of birds 56 each minute, depending on the spacing of the yokes 44. Both of the shafts 54 are supported by adjacent cross bars 34.

A carrier 58 between the chains 48 and 52 is provided for each bird-receiving head 60 respectively, each such carrier 58 including an elongated, transversely U-shaped backing member 62 having its channel facing inwardly. The longitudinal axes of the members 62 are vertically disposed and connections with the chains 48 and 52 at each yoke 44 respectively are made by use of extension straps 64 on the members 62. A transversely L-shaped tray 66 is secured to each member 62 respectively just above the chain 52. The member 62 has a series of three spaced, aligned, vertical slots (FIG. 3) of various lengths for clearance of various components, hereinafter described, passing fore and aft through such slots, and a shaft clearance opening between the two uppermost slots.

Figure 16:
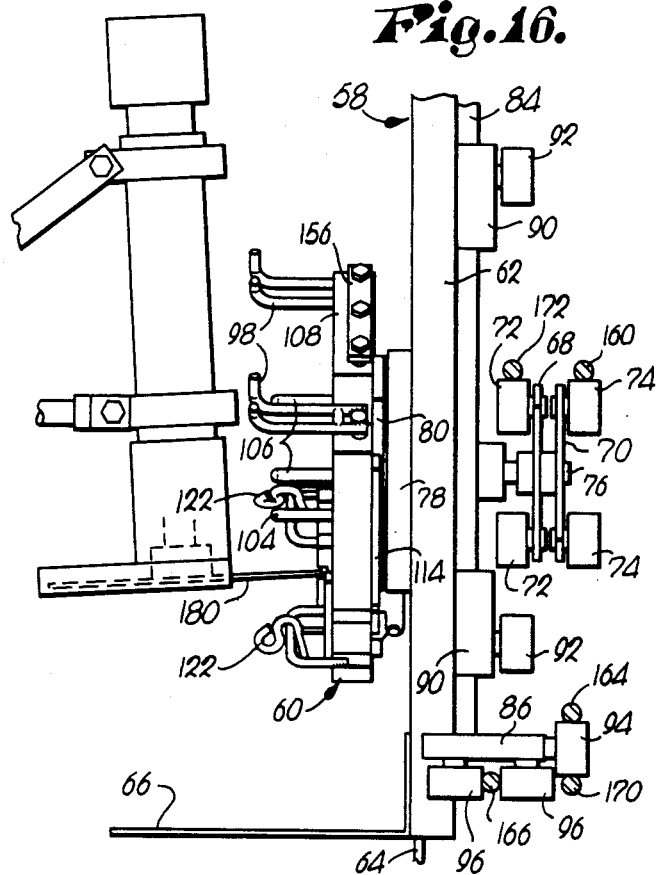
FIG. 16 is a fragmentary, side elevational view showing rotation of a head approximately 45° clockwise and illustrating the position of the severing blade during cut-off of the first wing at the shoulder.
Figure 17:
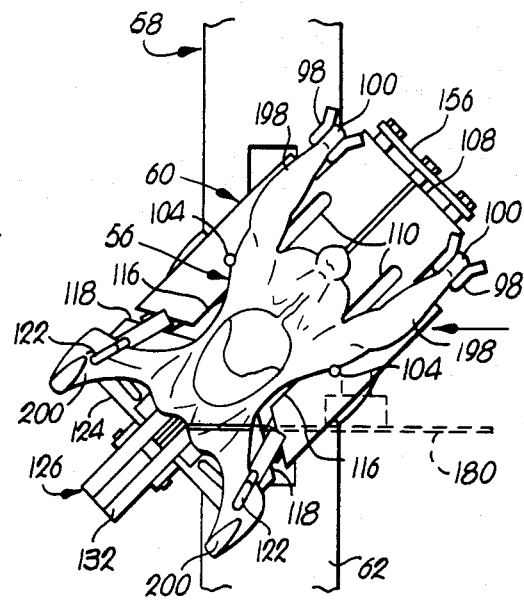
FIG. 17 is an elevational view of a bird on a head showing the same rotated about 45° clockwise as in FIG. 16.
Figure 18:
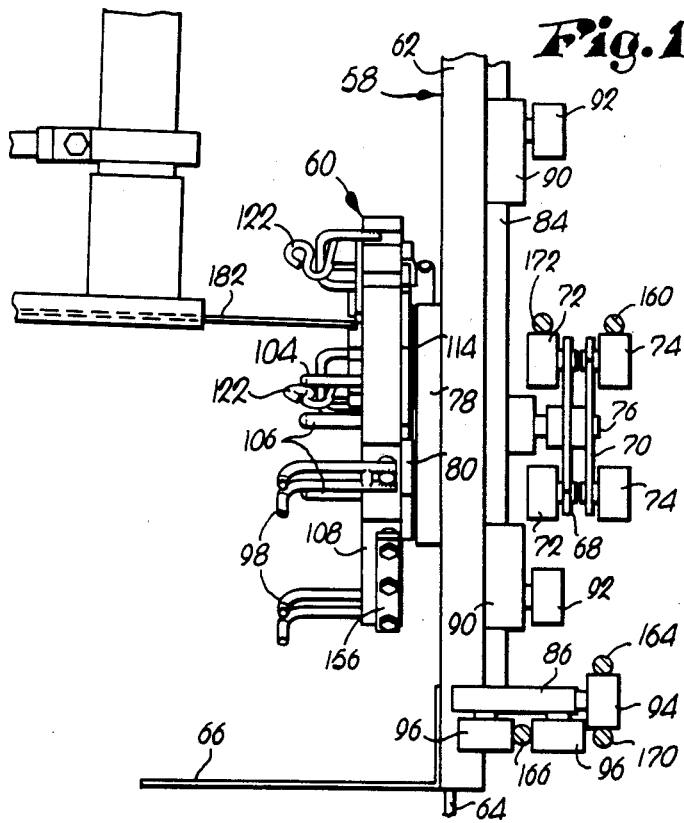
FIG. 18 is a view similar to 16 but showing a head rotated approximately 90° clockwise.
Figure 19:
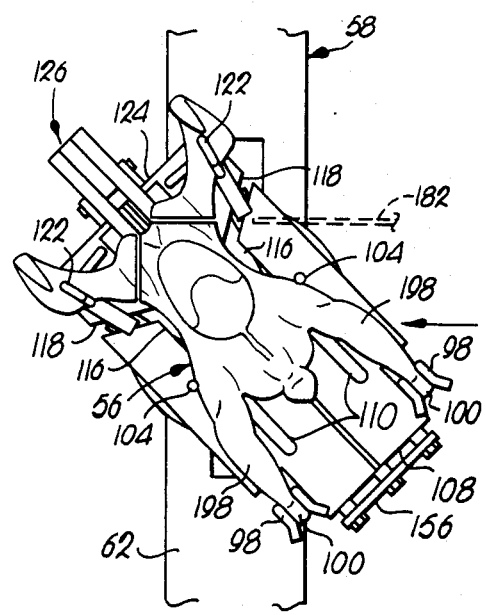
FIG. 19 is a view similar to FIG. 17 showing the additional 90° rotation of the bird and the head, as in FIG. 18.
Figure 20:
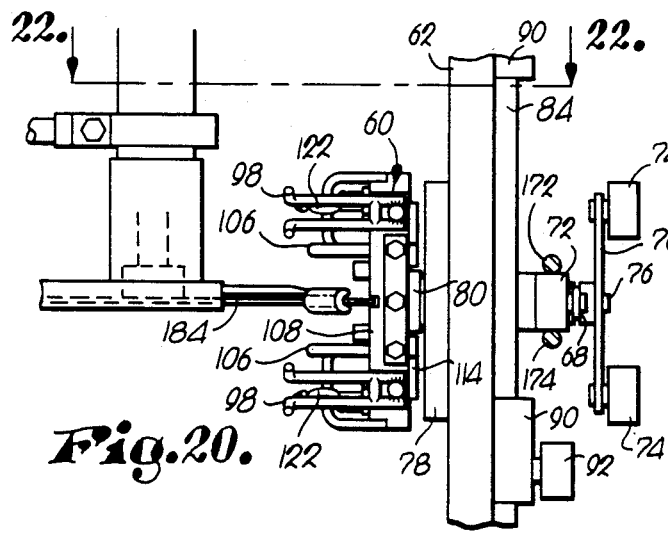
FIG. 20 is a side elevational view showing the head rotated back counterclockwise approximately 45° to a horizontal position, as distinguished from the vertical position shown, for example, in FIGS. 11, 12, 14 and 15.
Figure 21:
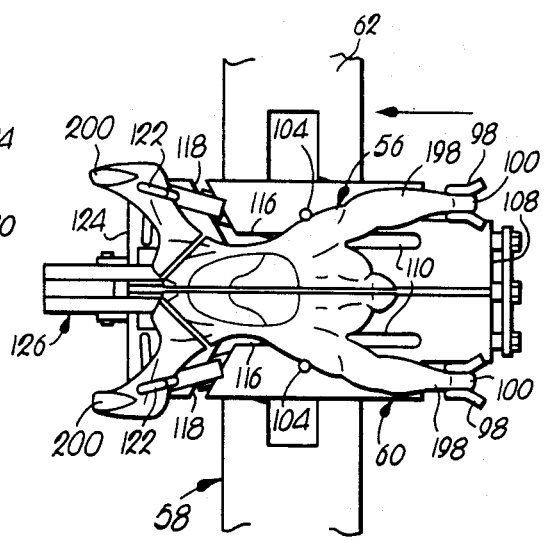
FIG. 21 is an elevational view showing the position of the head and the bird as illustrated in FIG. 20, and showing the slitting of the bird into two halves.
Figure 22:
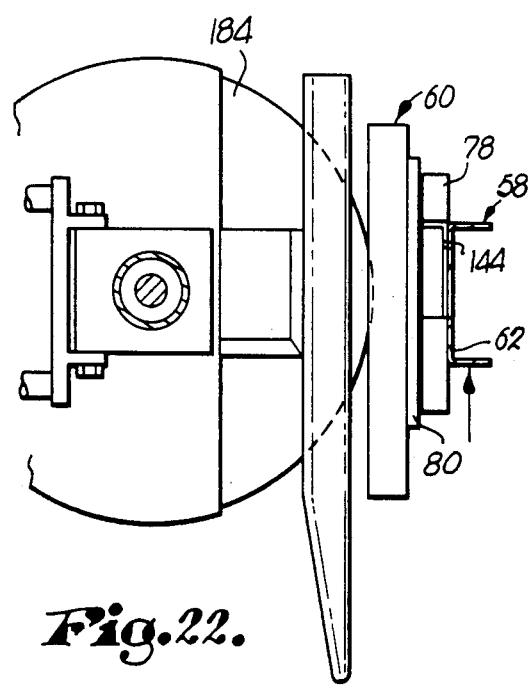
FIG. 22 is a fragmentary, cross-sectional view taken on line 22—22 of FIG. 20.

Inboard of each member 62 respectively there is provided a pair of crossed, rotator spokes 68 and 70 (FIGS. 4, 5, 10, 20, 23) having rollers at their ends, including two such rollers 72 on the front face of the front spoke 68 and two such rollers 74 on the back face of the rear spoke 70 (FIG. 16). However, all of the circumferentially spaced rollers 72 and 74 may, if desired, be mounted upon but a single, square rotator plate.

A rotatable shaft 76, clamped to the spokes 68 and 70, extends forwardly, freely through the member 62 to the head 60 and freely through a non-rotatable, dish-shaped element 78 bolted rigidly to the front face of the member 62 (FIG. 3). At its forward end the shaft 76 is rigidly secured to an elongated bar 80 (FIG. 6) extending longitudinally of the rectangular head 60 and secured by studs to the inboard face of the head 60. The bar 80 has longitudinal clearance notches 82 extending inwardly from its ends.

A pair of horizontally spaced, vertical guide rods 84 (FIGS. 4 and 5) between the member 62 and the spokes 68-70 and disposed within the channel of the member 62, are secured to the latter by upper and lower brackets 86 thereof. The rods 84 have upper and lower, double-sleeved slides 90 reciprocable vertically therealong, each slide 90 having a roller 92 inboard thereof, each rotatable about a horizontal axis.

Figure 4:
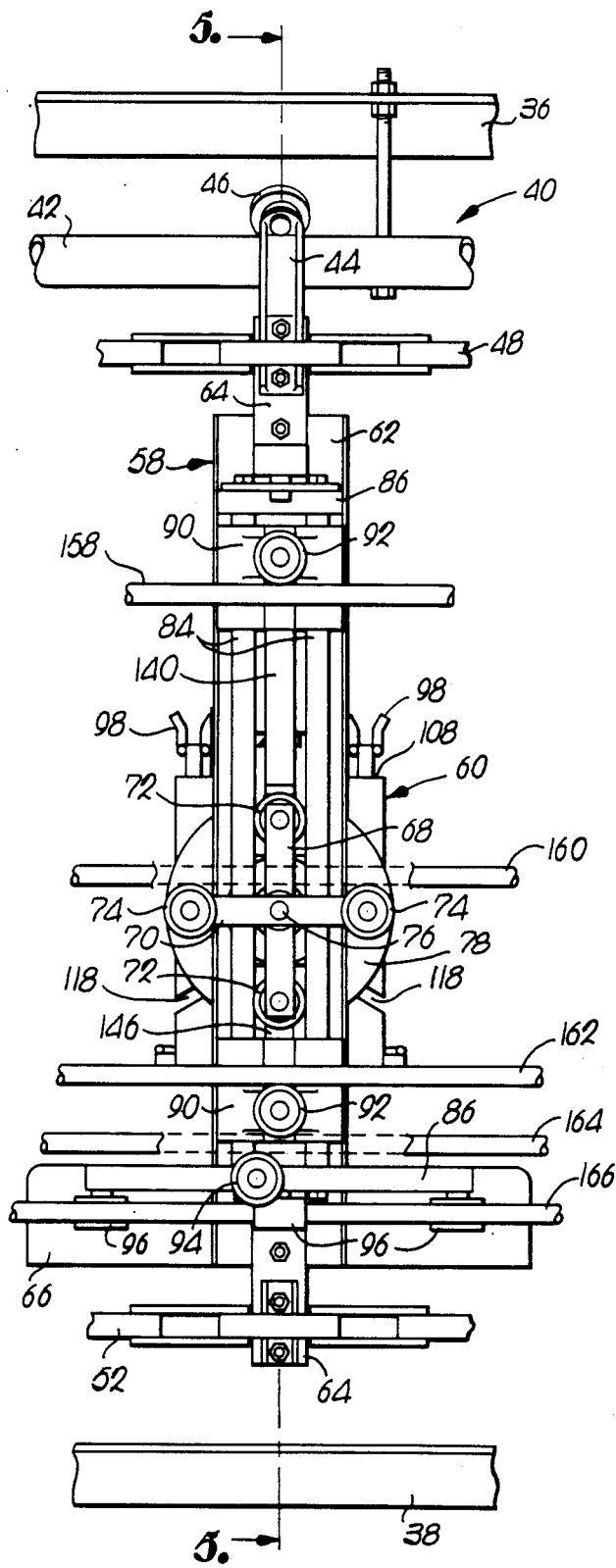
FIG. 4 is a rear elevational view of one of the carriers and its head thereon.
Figure 5:
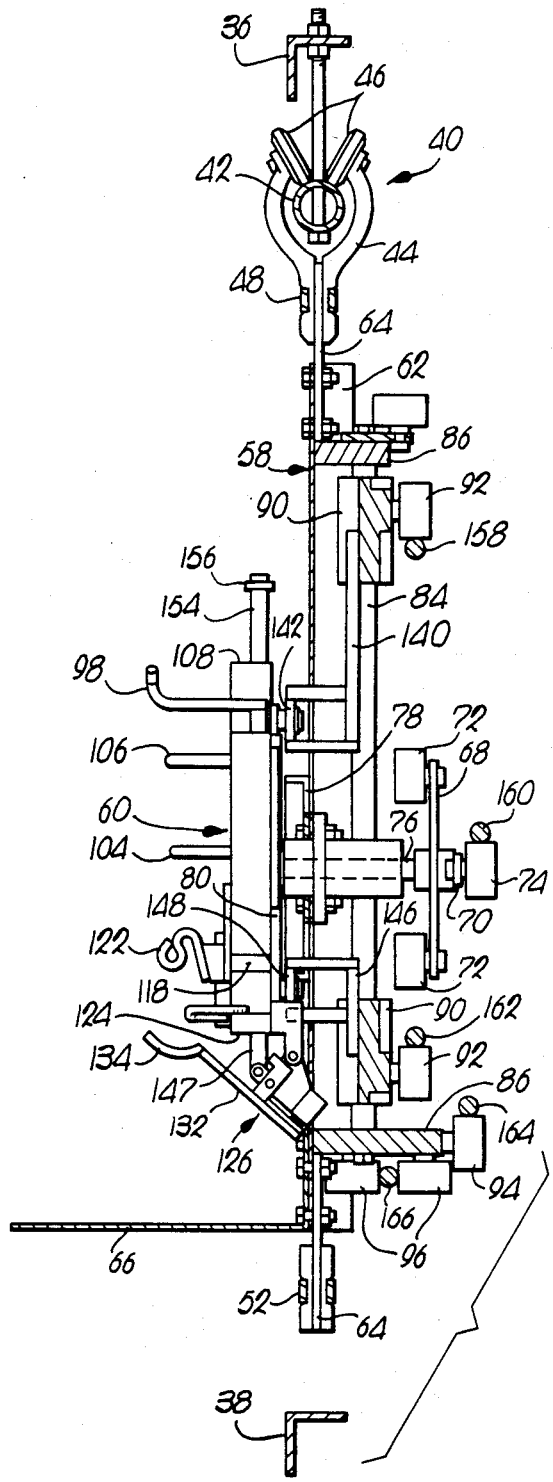
FIG. 5 is a vertical, cross-sectional view taken on line 5—5 of FIG. 4.

The shaft 76 passes horizontally between the rods 84 and is disposed between the upper and lower slides 90. The lower bracket 86 is provided with four rollers, one at its inboard edge, rotatable about a horizontal axis and designated 94, with three such rollers 96 carried by the lower bracket 86 therebeneath and rotatable about vertical axes (FIGS. 4 and 5).

Referring now more specifically to the series of bird-receiving heads 60 on their shafts 76, each is provided with a pair of uppermost, double prongs 98 (FIGS. 6 and 7) which receive the birds 56, hanging from their hocks 100 at the loading zone (FIG. 1) and the head 60 has its longitudinal axis vertically disposed during the time the head 60 is moving in the direction of arrow 101. At the loading zone, the loading is effected manually as the supply of birds is conveyed to such zone. The prongs 98 are secured to reciprocable, spring-loaded rods 102 extending into head 60.

Figure 6:
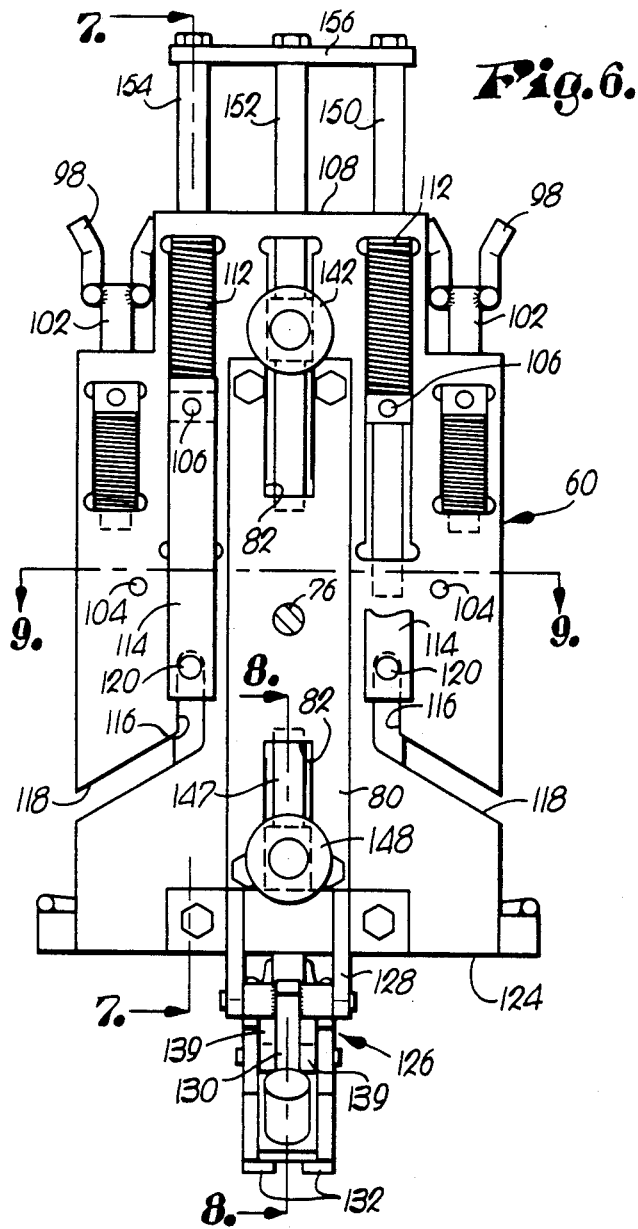
FIG. 6 is a view still further enlarged showing in rear elevation one of the heads removed from its supporting carrier.
Figure 7:
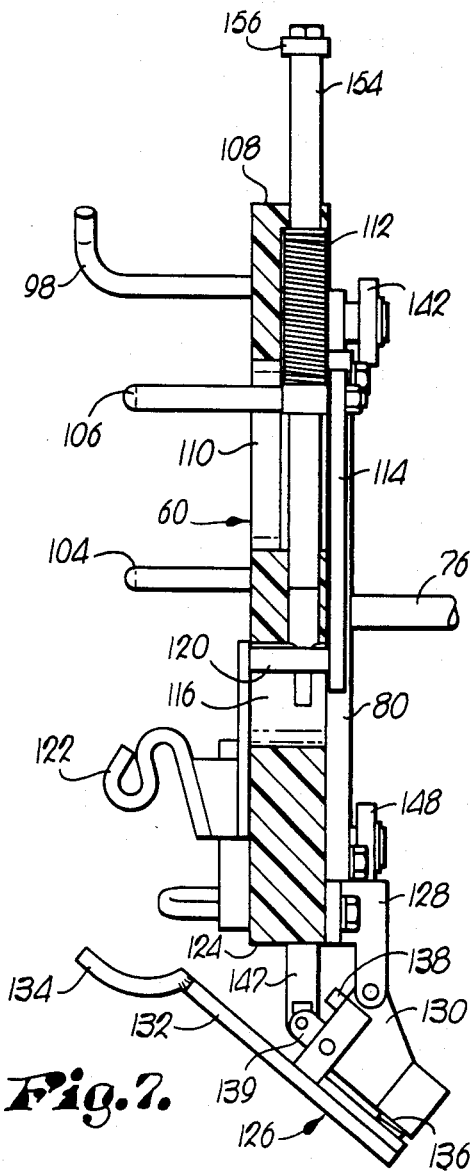
FIG. 7 is a cross-sectional view taken on lines 7—7 of FIG. 6.
Figure 9:
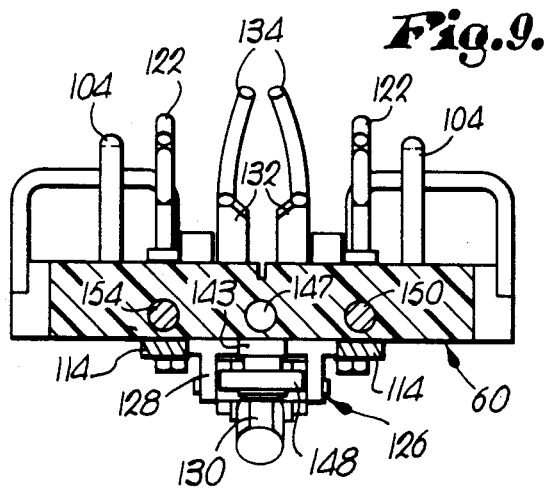
FIG. 9 is a transverse, cross-sectional view through the head taken on line 9—9 of FIG. 6.
Figure 8:
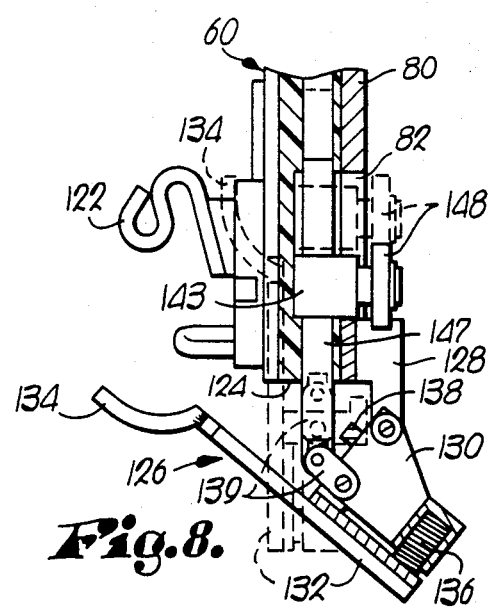
FIG. 8 is a fragmentary detailed, cross-sectional view taken on line 8—8 of FIG. 6.

The outboard face of the head 60 has a pair of outwardly projecting, spaced, rigid pins 104 lower than the prongs 98 and a pair of slightly higher, outwardly projecting, spaced, reciprocable pins 106. The spacing between the pins 106 is slightly less than the spacing between the pins 104 and the movement thereof is toward and away from the normally uppermost end 108 of the head 60 (see FIG. 29). The pins 106 ride along rectilinear slots 110 in the head 60 and are yieldably biased away from the end 108 by springs 112 disposed in cavities within the inboard face of the head 60 (FIGS. 6 and 7). The inboard ends of the pins 106 pivotally connect with links 114 between the head 60 and the member 62 (FIGS. 6 and 7).

Slots 116 in the head 60, shorter than the slots 110 (FIG. 29), but aligned therewith and spaced therebelow, extend into inclined slots 118 in the head 60 which open at the longitudinal edges of the head 60. Movable within the slots 116, 118 are pins 120 (FIGS. 6 and 7) which pivotally connect with the links 114. Each pin 120, carries a loop 122 extending outwardly from the outboard face of the head 60, the loops 122, therefore, being also influenced by the pressure of the spring 112.

With reference to FIGS. 3, 5, 10, 11, 14, 15, 17, 19, 21-25 and 27-29, at the normally lowermost end 124 of the head 60 there is provided an assembly 126 (but shown best in FIGS. 6 and 9) used in association with the neck cavity of the bird 56. It includes a bracket 128 secured to the head 60, a short, swingable link 130 pivotally attached to the bracket 128 and an elongated link 132 pivotally attached to the link 130, there being a pair of arcuate projections 134 on the upper free end of the link 132. The link 132 is spring loaded by a spring 136 between the links 130 and 132, limited by a stop 138. Linkage 139 pivotally joins the link 130 with a reciprocable rod 147 extending into the head 60 from its end 124, which rod 147, in turn, is rigid to a block 143 carrying a roller 148 (FIGS. 5-9 and 30).

Turning now to FIG. 5 and comparing it with FIGS. 6-10, 28 and 30, an upper, U-shaped bracket 140 rigid to and depending from the upper slide 90 receives a small upper roller 142 adapted to enter a top notch 144 of the retainer element 78 such as to engage a flange segment 144a of the element 78. And, the lower slide 90 has a lower, U-shaped bracket 146 receiving the small lower roller 148 adapted to enter a bottom notch 149 of the element 78 such as to engage a flange segment 144b of the element 78.

As seen in FIGS. 6, 7, 9, 11, 15, 24 and 29 there are three reciprocable rods 150, 154 extending into the upper end 108 of the head connected with the bracket 140 by a joinder 156. The rods 150 and 154 have the springs 112 coiled therearound and the roller 142 is connected with the rod 152 (FIG. 6).

With reference to FIG. 2, guiding of the carriers 58 and actuation of the heads 60, as well as all parts associated with the heads 60, is effected entirely by a multiplicity of elongated, longitudinally-extending, rod-like controllers supported within the framework of the machine 30, the primary of which are those engaged by the rollers 72—72, 74—74 of the spokes 68 and 70 and the rollers 92 of the slides 90 (FIGS. 4 and 5) which engage actuation controllers. The rollers 94 and 96 engage guide controllers (FIG. 2).

Figure 23:
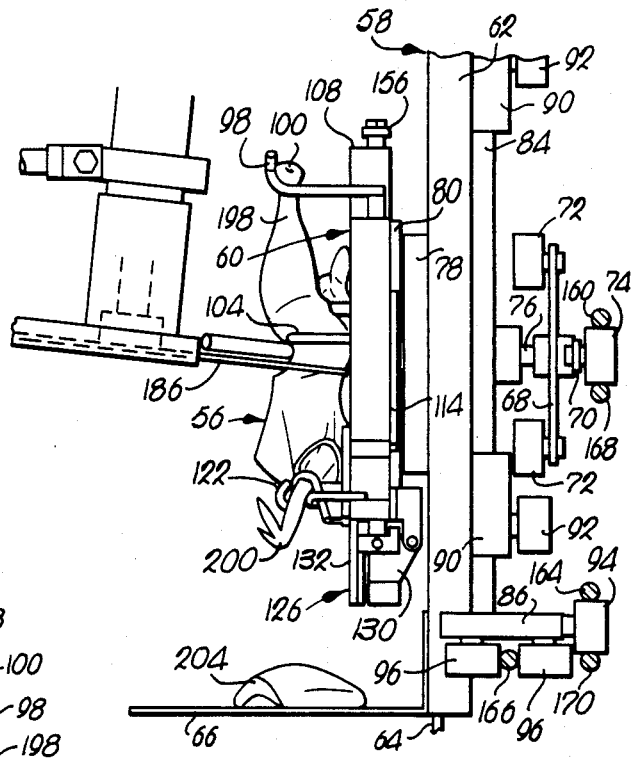
FIG. 23 is a fragmentary, side elevational view showing the head and the bird thereon rotated 90° counterclockwise, back to vertical, and illustrating the quarter cut into four pieces.
Figure 24:
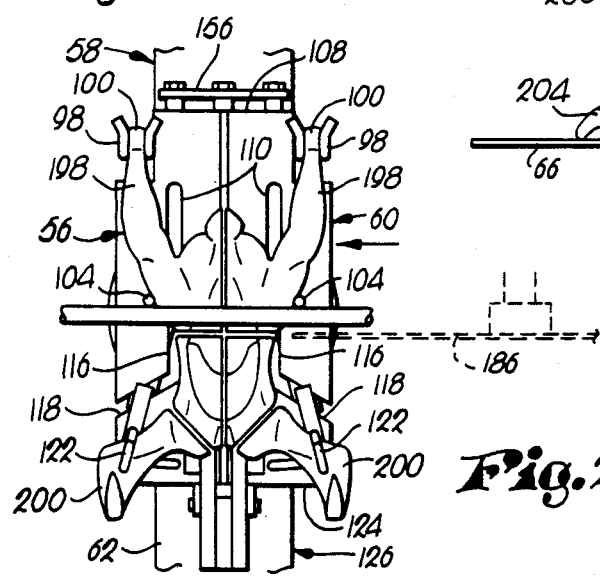
FIG. 24 is an elevational view of the bird on its head and illustrating the quarter cut of FIG. 23.
Figure 25:
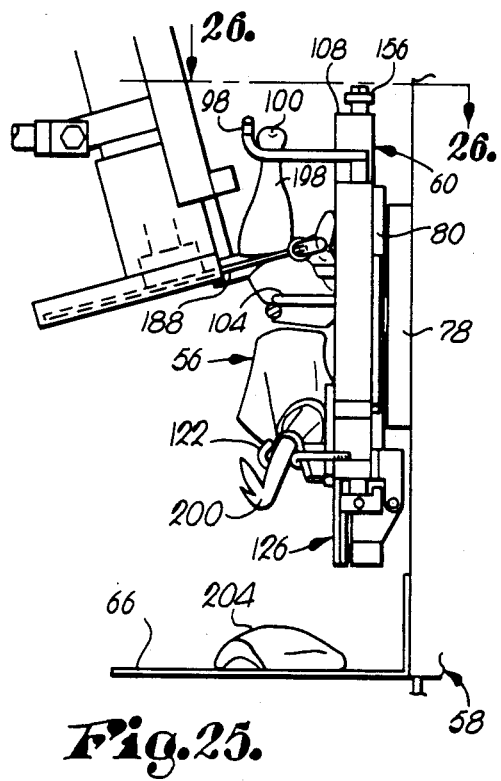
FIG. 25 is a side elevational view of the bird and its head, illustrating a leg cut off from the thigh.
Figure 27:
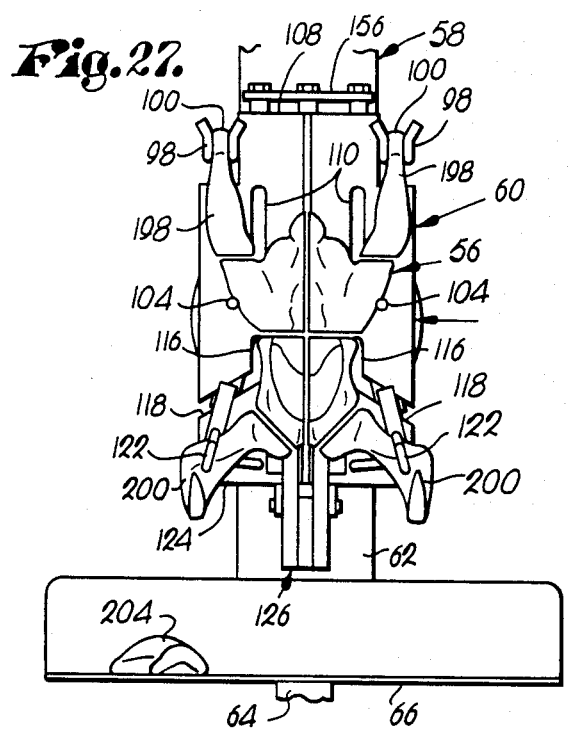
FIG. 27 is a elevational view of the bird illustrating all nine pieces namely, the keel, two wings, two legs, two thighs (each with a portion of the back), and two breast portions each with a portion of the back.
Figure 26:
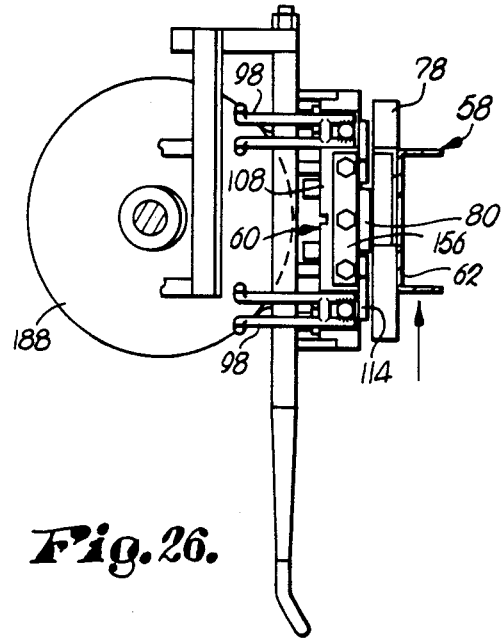
FIG. 26 is a cross-sectional view taken on line 26—26 of FIG. 25.
Figure 28:
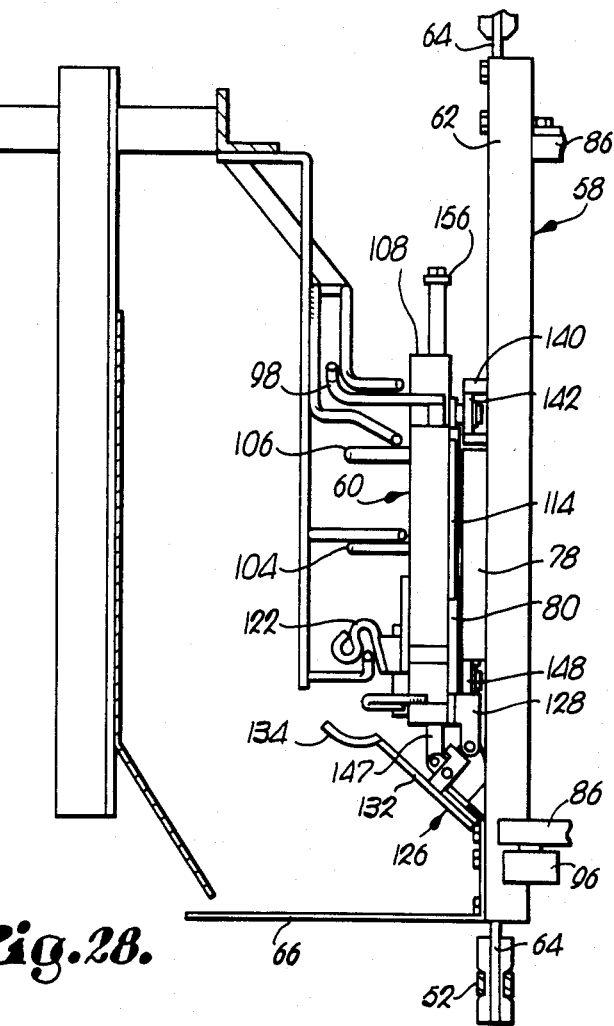
FIG. 28 is a side elevational view of a head and its supporting carrier (fragmentarily) taken at the unloading zone illustrated in FIG. 1.

Note in FIGS. 5, 6 and 10 that the upper roller 92 engages the top of an actuation controller 158, rollers 74 engage an actuation controller 160 therebeneath, the lower roller 92 engages an actuation controller 162 therebeneath, the roller 94 engages a guide controller 164 therebeneath and the rollers 96, 96 have a guide controller 166 therebetween. In FIG. 23 of the drawings there is shown still another actuation controller 168 beneath the rollers 74 and another guide controller 170 below the roller 94; and, in FIGS. 16, 18 and 20 there is illustrated an actuation controller 172 above the rollers 72, FIG. 20 also showing an actuation controller 174 beneath the rollers 72. As noted in FIG. 2, the controllers 158-174 are disposed, shaped and extended to such lengths as to effect their particular functions at proper times to cause severing of all pieces from each bird 56 during each cycle of revolution of the head 60 upon which it is associated.

To that end there are seven constantly rotating motor driven blades (FIG. 1) to effect severing, namely: (1) the first severance (flank) by a blade 176 (FIG. 10) set at 30° from vertical [The cut is made from the bottom of the blade 176. It slopes away from the heads 60, bottom to top.]; (2) the second severance (keel) by a blade 178 (FIGS. 12 and 13); (3) the third severance (1st wing) by a blade 180 (FIG. 16) set at 6° from horizontal; (4) the fourth severance (2nd wing) by a blade 182 (FIG. 18) set at 6° from horizontal and sloping upwardly from the machine 30; (5) the fifth severance (back slit) by a blade 184 (FIGS. 20 and 22) set horizontally; (6) the sixth severance (quarter cut) by a blade 186 (FIG. 23) set 9° from horizontal and sloping upwardly from the machine 30; and (7) the seventh severance (drum cut) by a blade 188 (FIGS. 25 and 26) set at 18° from horizontal and sloping downwardly from the machine 30.

In the event eight instead of nine pieces are desired, support is arranged such that the blade 178 may be backed out of position or made removable. It is desirable that the blade 186 be adjustable to vary the blade angle. All the blades 176-182 and 186, 188 should rotate at about 1750 r.p.m. and the blade 184 should rotate about 2400 r.p.m.

OPERATION

FIG. 2 illustrates the various positions of the head 60 during each cycle. The initial vertical position after the heads 60 have moved around the arc at the right sprocket wheels 50 (FIG. 1) is designated 190. After loading and completion of two keel severances by blades 176 and 178, head 60 rounds the arc at the left sprocket wheels 50 (FIG. 1) and commences travelling oppositely to arrow 101. It is then rotated about 45° clockwise to a second position 192 for the first wing severance by the blade 180. Thereupon, for the severance of the second wing by the blade 182, the head 60 is rotated about another 90° clockwise to a third position 194. Next, for a fourth position 196, the head 160 is rotated about 45° counterclockwise, positioning its longitudinal axis horizontally for the back slit by the blade 184. Then the head 60 is rotated about another 90° counterclockwise back to position 190 for the two remaining severances (quarter and legs) by the blades 186 and 188 and for discharge of the severed parts from the head 60 and for movement around the arc at the right hand wheels 50.

As above indicated, while the heads 60 are continuously advancing in the direction of the arrow 101 (FIG. 1) and the blades 176-188 are constantly rotating, a bird 56 is manually placed on each head 60 as it passes the loading zone (FIG. 1) by hanging the hocks 100 into the two double prongs 98. This positions the bird 56 between the pins 104, assures positioning of the pins 106 between the legs 198, with the bird 56 against the head 60, places the neck cavity above the projections 134, causes the backbone to be movable against the head 60 at the neck cavity and places the wings 200 for reception by the loops 122 therebelow (FIG. 11).

Thereupon, complete automation commences in the downward keel slice (FIG. 10) as the bird 56 advances along the blade 176 therebeneath. At this juncture the rods 150, 152 and 154 move downwardly from the position shown in FIGS. 3, 6, 7, 11, 16, 28 and 29 to the position shown in FIGS. 12, 14, 15, 17, 17, 23-25 and 27 to thereby shift the pins 106 into the hip area of the bird 56 at the thighs, to seat the hocks 100 tightly into the prongs 98 and to hold the bird 56 tightly against the pins 104, all through the descent of the rollers 92—92 as forced by their controllers 158 and 162. At this time also, the roller 148 descends and enters the element 78 (at the upper notch 144 between segments 144a and 144b (FIG. 30) in response to descent of the rod 152.

Moreover, descent of the rods 150 and 154 lowers the links 114 and the pins 120 to spread the wings 200 of the bird 56 as captured by the descending loops 122. This also stretches the thighs of the bird 56 against the resistance of the prongs 98. When the bird 56 reaches the blade 178 (FIGS. 12 and 13) the slice made by the blade 176 is received by a stationary opener 202, and the cut-away keel 204 drops onto the underlying tray 66 where it remains until reaching the unloading zone (FIG. 1). A plurality of elements 206 in opposed relationship to the opener 202 retain the keel 204 during the cut being made by the blade 178.

Turning now to FIGS. 1, 2 and 16, for the severance of the first wing 200, the position 192 of the head 60 is the result of the rollers 72-74 contacting their controllers 172, 160 and 168, rotating the spokes 68, 70 the shaft 76, the bar 80 and, therefore, the head 60, following which the blade 180 operates as is evident in FIG. 16. Head rotation to position 194, through rotation of the shaft 76, now permits severance of the second wing 200 (see FIGS. 1, 2 and 18).

Once again the controllers 160, 168 and 172 now cause rotation of the head 60 to position 196 and the blade 184 severs or slits the back of the bird 56, following which the head 60 returns to position 190 and the last two severing operations take place by blades 186 and 188, the latter severing both legs 198 simultaneously at the joint between the legs and the thighs. All pieces, except for the keel 204 are retained on the head 60 prior to unloading.

With reference to FIG. 30, showing the rigid element 78, its pair of opposed, arcuate segments 144a and 144b of its flange and the upper and lower notches 144 and 149 between the segments 144a and 144b, the rollers 142 and 148 are normally above and below the element 78, and do not enter the element 78 until after the first keel cut. After the rollers have entered the notches the second keel cut takes place. Then the roller 148 rolls along the inner face of the segment 144b and when, at the same time, the roller 142 rolls along the inner face of the segment 144a. The rollers 142 and 148 roll in the element 78 simultaneously. In phantom, the locations of the rollers 142 and 148 are shown during the first wing cut (locations A and A'), during the time of the second wing cut (locations B and B') and during the back slit (locations C and C'), in such sequence, following which the rollers 142 and 148 return to the positions shown by full lines in FIG. 30. At that time the quarter cut and the leg cut take place. Such movements of the rollers 142 and 148 within the rigid element 78 operate to retain the wing loops 122 and the rump-engaging members 106 in their operated positions holding and stretching the bird as the various rotary positioning movements of the heads 60 occur.

Figure 29:
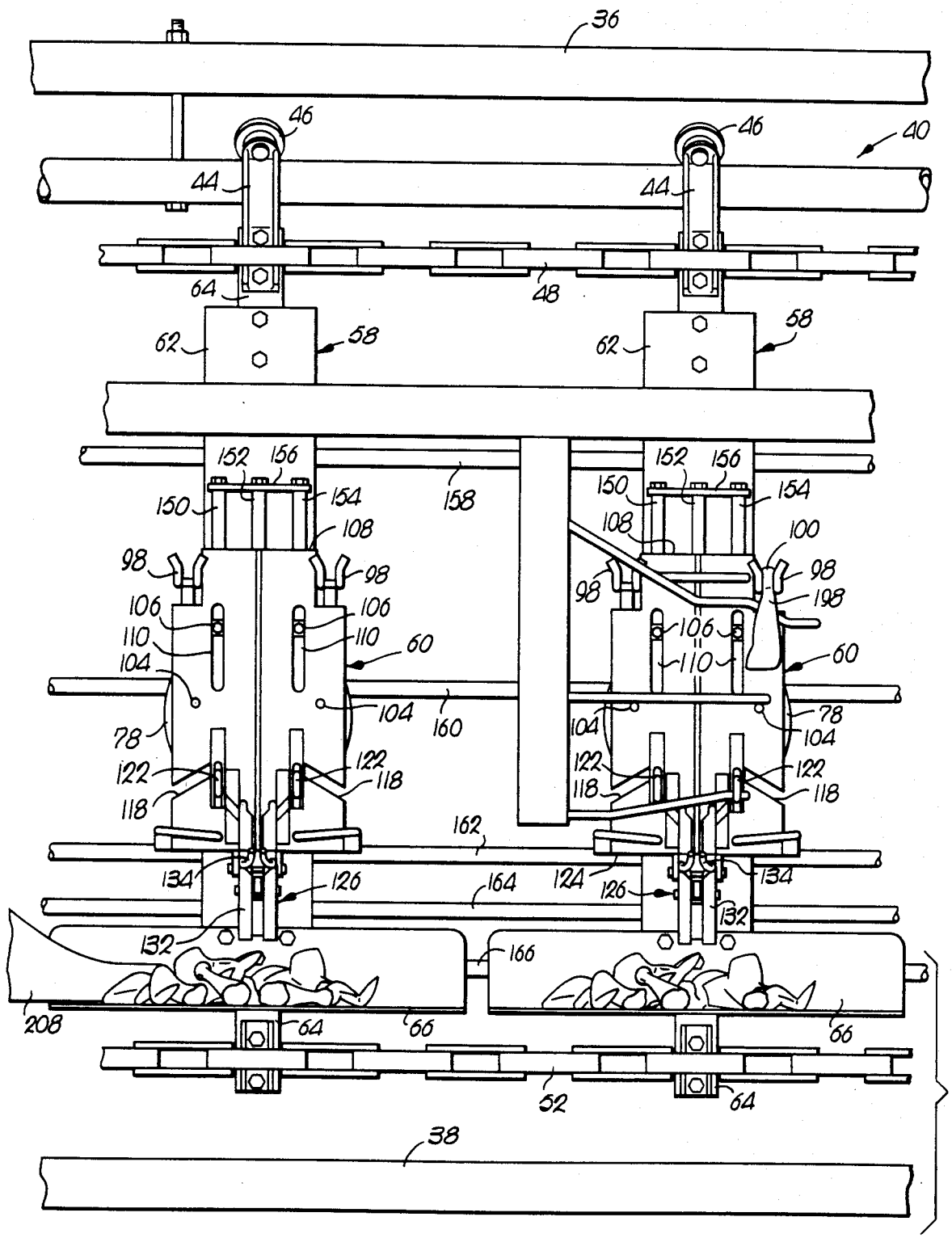
FIG. 29 is an a view showing a pair of heads in front elevation, one illustrating the action at the unloading zone releasing eight of the parts onto the tray, the other illustrating the manner of wiping all nine parts of the bird off the tray.

In the unloading zone (FIG. 1) the rollers 142 and 148 exit the element 78 and all of the eight pieces are released from the head 60 for gravitation onto the underlying tray 66, joining with the keel 204, as seen in FIG. 29, at which time a wiper 208 (FIG. 29) clears the tray 66 of all nine parts and makes delivery to a bagger (not shown) before the head 60 traverses the arcuate path back to the loading zone (FIG. 1).

Summarizing, the bird 56 is stabilized on the head 60 after the first keel cut by the pins 104 and 106 engaging the body of the bird 56, by the loops 122 receiving the wings 200 and by the projections 134 entering the neck cavity, thereby maintaining the back of the bird 56 against the front of the head 60, stretching the wings 200 outwardly away from each other and stretching the bird downwardly against the resistance of the hock prongs 98. Then, all such stabilizing components are retained as the head 60 rotates by the non-rotatable element 78 because of the rolling of the rollers 142 and 148 therewithin which exit the element 78 prior to unloading. At the unloading zone the stabilizer components return to their starting positions as influenced by release on the part of the controllers 158-162, 168, 172 and 147 and the action of the springs 112 and 136.

I claim:

1. In a poultry cut-up machine,
   a plurality of elongated, upright, horizontally-spaced carriers;
   a conveyor supporting the carriers for horizontal advancement along a continuous course;
   a conveyor drive for advancing the carriers uninterruptedly;
   a block-like, rectangular, bird-receiving head outboard of each carrier respectively and provided with a first set of rollers;
   a horizontal shaft for each head respectively mounting the same on the carriers for swinging movement both clockwise and counterclockwise about horizontal axes traversing said course;
   releasable, bird-engaging mechanism on each head respectively for stablizing the bird thereon and provided with a second set of rollers;
   a number of horizontally spaced, power driven, rotatable blades within the path of travel of the birds for severing the same into a multiplicity of separate pieces;
   a first series of elongated, stationary, spaced-apart, rod-like actuators inboard of the carriers and engageable with said first set of rollers for swinging the heads to a number of positions for successively moving the birds into predetermined locations relative to the blade; and
   a second series of elongated, spaced-apart, stationary, rod-like actuators inboard of the carriers and engageable with said second set of rollers for controlling said mechanism.

2. The invention of claim 1, said conveyor having an upper and a lower chain and sprocket wheel assembly, the carriers spanning the distance between the chains and having means connecting the same thereto.

3. The invention of claim 1; a continuous elliptical, tube track above the conveyor; wheeled yokes spaced horizontally along the track and supported thereby for rolling movement therealong; and connector means suspending each carrier from a corresponding yoke.

4. The invention of claim 3, said conveyor having an upper and a lower chain and sprocket wheel assembly, the carriers spanning the distance between the chains and having means connecting the same thereto.

5. The invention of claim 1; and a tray connected to each carrier respectively below its head for receiving one of the severed pieces.

6. The invention of claim 1; a third set of rollers mounted on each carrier respectively inboard thereof; and an elongated, stationary, rod-like guides inboard of the carriers and engageable with said third set of rollers for guiding the carriers along said course.

7. The invention of claim 1, the shafts extending through the carriers for free rotation relative thereto, and being rigid at their outboard ends to the inboard faces of the heads.

8. The invention of claim 7; and a rotator rigid to each shaft respectively at the inboard end of the latter, said first set of rollers being mounted on the rotator.

9. The invention of claim 1, said mechanism including bird-engaging pins reciprocable longitudinally along each head respectively; and structure between each head respectively and its carrier for actuating the pins.

10. The invention of claim 9, each head having means for hanging a bird therefrom by its hocks, said pins being movable to a position engaging the sides of the bird at its shoulders and in a direction for stretching the legs of the bird away for the hanging means.

11. The invention of claim 1, said mechanism including loops shiftably carried by each head respectively for receiving the wings of the bird; and means for shifting the loops in a direction to spread the wings apart.

12. The invention of claim 10, said mechanism including loops shiftably carried by each head respectively for receiving the wings of the bird; and means for shifting the loops in a direction to spread the wings apart and in a direction for stretching the wings away from the hanging means.

13. The invention of claim 1; and structure between each head and its corresponding carrier for retaining the heads in certain of said positions and, therefore, for retaining the birds in certain of said locations during corresponding severances by related blades.

14. The invention of claim 13, each structure including an essentially dish-shaped element rigid to an ajacent carrier between the latter and its head, said member having a pair of opposed flange segments, and roller means engaging the segments while the heads are in said predetermined positions.

15. The invention of claim 14, each carrier having upright, inboard guide means rigid thereto, slide means reciprocable along the guide means and actuation controller means for reciprocating the slide means, said roller means which engage the segments being mounted on said slides.

16. The invention of claim 1, said first set of rollers for each head including an inner pair of diametrically opposed rollers on opposite sides of said horizontal axis of rotation of the head and an outer pair of diametrically opposed rollers offset 90° from the inner pair and disposed on opposite sides of said axis of rotation of the head, said inner and outer pairs of rollers being axially spaced from one another along said horizontal axis of rotation of the head, said first series of rod-like actuators including an inner actuator aligned vertically with the inner pair of rollers for operating engagement therewith and an outer actuator spaced axially from the inner actuator along said horizontal axis of rotation of the head in vertical alignment with the outer pair of rollers for operating engagement therewith, whereby to facilitate indexing rotation of the head through more than 180° during each complete series of cutting operations on a bird.

17. In a holder for retaining a poultry carcass immobilized and stretched out during severing of the carcass into a number of separate pieces as the holder is advanced along a path of travel, the improvement comprising:

means for suspending the carcass by its hocks;

a normally upright support engageable against the back of the carcass while the latter is suspended by its hocks;

a pair of downwardly opening, laterally spaced apart wing hooks projecting outwardly from said support and disposed to receive and capture respective wings of the carcass therebeneath when the carcass is placed on the holder and the wings are manually slipped under the hooks; and mechanism operably coupled with the hooks for driving the same downwardly and laterally outwardly away from one another in a direction generally parallel to said path of travel of the holder and then holding the hooks at the downward and outward location while the wings are captured beneath the same whereby to stretch out the carcass for severance.

18. In a holder as claimed in claim 17, wherein said mechanism is operable to first move the hooks in generally mutually parallel paths of downward travel and thence in diverging paths of downward travel as the hooks are forced to their downward and outward locations.

19. In a holder as claimed in claim 17, wherein each of said hooks has a rump-engaging member spaced upwardly therefrom and movable therewith in disposition for pressing downwardly against the rump of the carcass as the hooks move downwardly and outwardly.

20. In a holder as claimed in claim 19, wherein each of said hooks has a motion-transmitting link swingably coupling the same with the respective rum-engaging member for permitting the latter to move in a straight-line path of travel during pressing engagement with the rump of the carcass while the hook swings to its outward and downward location.

21. In a holder as claimed in claim 20, wherein said mechanism includes a cam follower on each of said hooks respectively and a cam slot in said support for each of said followers.

* * * * *